United States Patent
Kosten et al.

(10) Patent No.: US 11,760,298 B2
(45) Date of Patent: Sep. 19, 2023

(54) CURTAIN AIRBAG WITH ANTI-TWIST STRUCTURES

(71) Applicant: ZF Passive Safety Systems US Inc., Washington, MI (US)

(72) Inventors: Greg Kosten, Bruce Township, MI (US); Dylan Moran, Rochester Hills, MI (US); Kevin Ruedisueli, Oxford, MI (US); Courtney McKeon, Macomb, MI (US); Luis Raul Valles Rey, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/311,925

(22) PCT Filed: Dec. 17, 2019

(86) PCT No.: PCT/US2019/065870
§ 371 (c)(1),
(2) Date: Jun. 8, 2021

(87) PCT Pub. No.: WO2020/123751
PCT Pub. Date: Jun. 18, 2020

(65) Prior Publication Data
US 2022/0024403 A1    Jan. 27, 2022

Related U.S. Application Data

(60) Provisional application No. 62/778,328, filed on Dec. 12, 2018.

(51) Int. Cl.
   *B60R 21/213*    (2011.01)
   *B60R 21/231*    (2011.01)
   (Continued)

(52) U.S. Cl.
   CPC .......... *B60R 21/213* (2013.01); *B60R 21/232* (2013.01); *B60R 21/237* (2013.01); *B60R 21/23138* (2013.01)

(58) Field of Classification Search
   CPC ... B60R 21/213; B60R 21/232; B60R 21/237; B60R 21/201
   See application file for complete search history.

(56) References Cited

U.S. PATENT DOCUMENTS 9,321,417 B1    4/2016    Lepper
2003/0230878 A1*    12/2003    Inoue ............. B60R 21/26
                                                                                 280/730.2
(Continued)

*Primary Examiner* — Karen Beck
(74) *Attorney, Agent, or Firm* — TAROLLI, SUNDHEIM, COVELL & TUMMINO LLP

(57) ABSTRACT

An apparatus for helping to protect an occupant of a vehicle includes a curtain airbag (CAB) having a packaged condition in which the CAB is rolled and/or folded to be installed along a roof rail in a vehicle. The CAB is configured to be inflated and deployed along a side structure of the vehicle structure. The apparatus includes an anti-twist structure for being positioned within the rolls and/or folds to inhibit relative twisting of the packaged CAB within the rolls and/or folds. The apparatus includes a CAB mount for extending about and supporting the packaged CAB in the vehicle. The CAB mount cooperates with the anti-twist structure to fix the position and orientation of the anti-twist structure, and thus the packaged CAB, relative to the vehicle.

19 Claims, 15 Drawing Sheets

(51) Int. Cl.
    *B60R 21/232*     (2011.01)
    *B60R 21/237*     (2006.01)

(56) References Cited

U.S. PATENT DOCUMENTS

| | | | |
|---|---|---|---|
| 2005/0057023 A1* | 3/2005 | Burton | B60R 21/232 |
| | | | 280/730.2 |
| 2005/0087960 A1* | 4/2005 | Gammill | B60R 21/232 |
| | | | 280/730.2 |
| 2006/0119084 A1* | 6/2006 | Coon | B60R 21/232 |
| | | | 280/730.2 |
| 2010/0327563 A1 | 12/2010 | Ruedisueli et al. | |
| 2011/0101656 A1 | 5/2011 | Kim et al. | |
| 2012/0119048 A1 | 5/2012 | Kim et al. | |
| 2012/0267879 A1 | 10/2012 | Kim et al. | |
| 2015/0367801 A1* | 12/2015 | Fukuda | B60R 21/201 |
| | | | 53/442 |
| 2016/0075300 A1* | 3/2016 | Tietze | B60R 21/201 |
| | | | 280/728.2 |
| 2022/0024403 A1* | 1/2022 | Kosten | B60R 21/201 |

\* cited by examiner

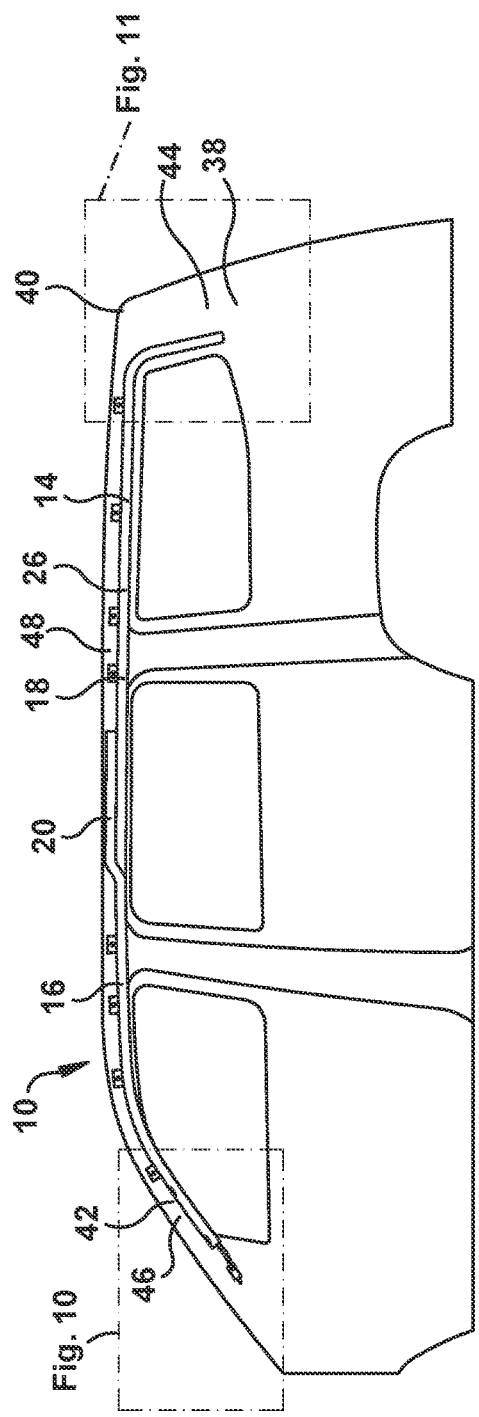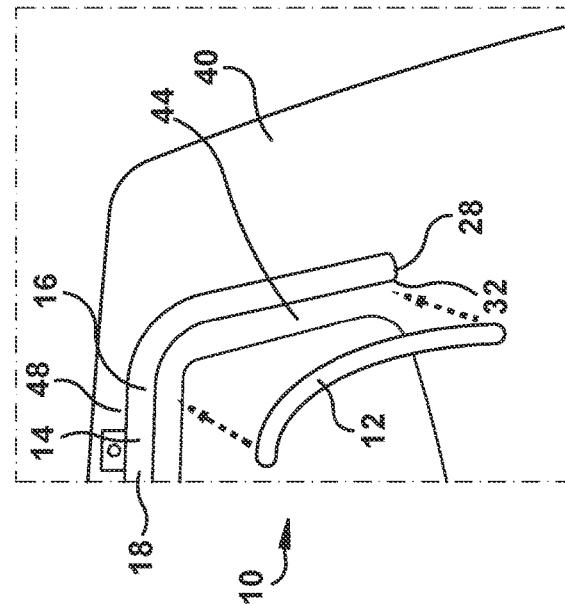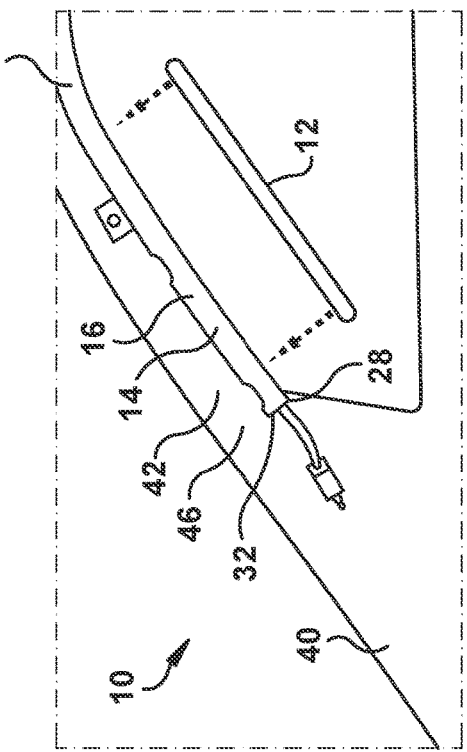

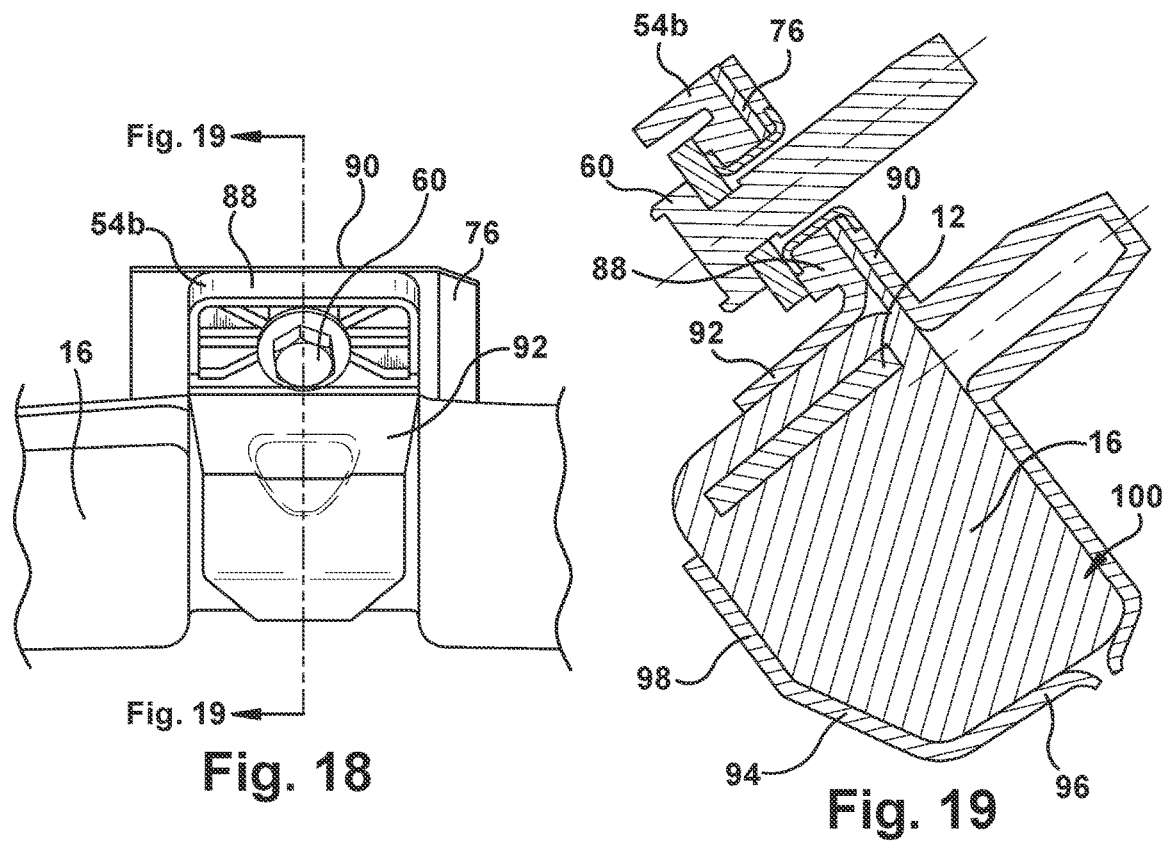
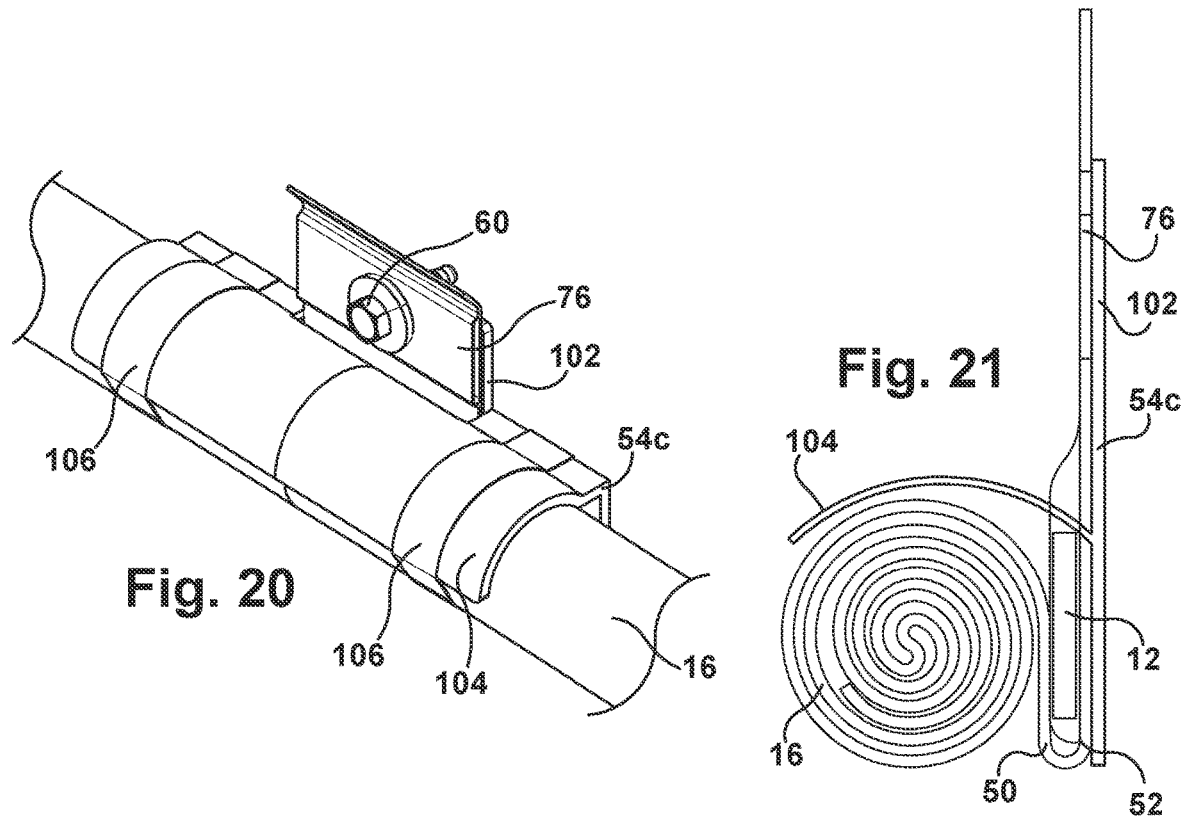

CURTAIN AIRBAG WITH ANTI-TWIST STRUCTURES

RELATED APPLICATION

This application is a national stage filing of PCT/US2019/065870, filed Dec. 17, 2019, which claims priority from U.S. Provisional Application No. 62/778,328, filed 12 Dec. 2018, the subject matter of which is incorporated herein by reference in its entirety.

FIELD OF THE INVENTION

The invention relates to an apparatus for helping to protect an occupant of a vehicle. More particularly, the invention relates to an apparatus that includes a curtain airbag and a structure for inhibiting twisting of the curtain airbag.

BACKGROUND OF THE INVENTION

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle rollover, or a combination thereof. One particular type of airbag is an inflatable curtain or curtain airbag ("CAB") that is inflatable away from the roof of the vehicle between a vehicle occupant and the side structure of the vehicle. A known CAB is inflated from a deflated and stowed condition extending along the vehicle roof rail, at or near the intersection of the side structure of the vehicle and the vehicle roof. The CAB is concealed by the vehicle headliner and trim pieces.

CABs can have a variety of constructions. For example, a CAB can have a cut-and-sewn construction in which overlying panels are cut to size and interconnected by stitching to form seams that define inflatable chambers between the panels as well as non-inflatable portions outside the chambers. Alternatively, a CAB can have a one piece woven (OPW) construction in which the woven airbag structure has portions or layers woven separately and simultaneously to define inflatable chambers, with portions interwoven to define single layer seams and non-inflatable regions of the OPW CAB. OPW CABs can have stitching added after the bag is woven.

Upon sensing the occurrence of an event for which inflation of the airbag is desired, such as a vehicle collision, a sensor provides a signal to the inflator. Upon receiving the signal from the sensor, the inflator is actuated and provides inflation fluid to the airbag in a known manner. The inflating airbag exerts a force that ruptures, tears, displaces, or otherwise opens the concealing structure (e.g., headliner, trim pieces, padding, etc.), and the airbag inflates toward a fully inflated and deployed condition. The airbag, while in this inflated and deployed condition, helps protect the vehicle occupant from impacts, such as with parts of the vehicle.

CABs are typically placed in the stored condition by rolling and/or folding. Rolling is, however, typically the primary manner in which CABs are placed in a packaged condition, ready for installation in the vehicle. One particular rolling/folding method is referred to herein as a "+1" roll-fold in which the CAB is rolled from the lower edge up, with a flip fold being added along the upper edge, above the rolled portion. The +1 fold, in effect, involves adding one or more pleats along the upper edge of the CAB. The "packaged condition" refers to the CAB in its ready-to-install condition, regardless of whether it is rolled, folded, or a combination of rolled and folded. In the packaged condition, the CAB can also include additional features and/or structures, such as packaging sleeves and/or wraps, installation and/or fastening structures (fasteners, clamps, brackets, etc.), and inflation components, such as inflators, fill tubes, diffusers, etc.

When installing the packaged CAB, care must be exercised so that the airbag is rolled-up evenly so that it also deploys evenly. Additionally, care must be exercised so as to avoid twisting the packaged CAB both while placing the airbag in the packaged condition and during installation of the packaged airbag. "Twisting" as described herein can occur as a result of a) uneven rolling of the CAB while being packaged and/or b) twisting the packaged CAB during installation. Conventionally, CABs are at least partially installed using mounting straps that connect the CAB to mounting points in the vehicle. These straps are, however, notoriously difficult to work with and can get in the way of installation.

Visual anti-twist lines can also be used, but they rely on operators or a vision system to check continuity of a line on the CAB to ensure that the package doesn't twist. Further, these visual anti-twist lines do not physically prevent the CAB from twisting. Mechanical anti-twist features, such as the aforementioned straps, are more robust, as they physically prevent CAB package twisting. Although mechanical anti-twist features are more robust, they also often carry a high cost and sometimes are added after the folding of the curtain airbag assembly which could allow for twisting before the addition of the anti-twist features. Anti-twist strips attached between mounting points (either fabric or plastic (e.g., HDPE)) have been found acceptable but, depending on vehicle geometry, the CAB package can still be twisted prior to installation. These also unnecessarily interfere with other vehicle structures during installation. Sewn in plastic strips (injection molded or extruded plastic) can also be acceptable but are excessive in cost and weight. These structures can, for example, require additional sewing operations to connect the strips to the CAB and can result in an overly thick CAB construction.

SUMMARY OF THE INVENTION

According to one aspect, an apparatus for helping to protect an occupant of a vehicle includes a curtain airbag (CAB) having a packaged condition in which the CAB is rolled and/or folded to be installed along a roof rail in a vehicle. The CAB is configured to be inflated and deployed along a side structure of the vehicle structure. The apparatus includes an anti-twist structure for being positioned within the rolls and/or folds to inhibit relative twisting of the packaged CAB within the rolls and/or folds. The apparatus includes a CAB mount for extending about and supporting the packaged CAB in the vehicle. The CAB mount cooperates with the anti-twist structure to fix the position and orientation of the anti-twist structure, and thus the packaged CAB, relative to the vehicle.

According to another aspect, alone or in combination with any other aspect, the CAB mount can include a fin and a detent between which the anti-twist structure, positioned within the CAB, is received.

According to another aspect, alone or in combination with any other aspect, the CAB mount can grasp the anti-twist structure between the fin and the detent and fix the relative position and orientation of the anti-twist structure relative to the vehicle.

According to another aspect, alone or in combination with any other aspect, the anti-twist structure can be positioned adjacent a pleat along an upper edge of the CAB. The CAB mount can fix the position and orientation of the pleat relative to the vehicle.

According to another aspect, alone or in combination with any other aspect, the fin and the detent can be positioned on opposing sides of the pleat and can grasp the pleat to fix the position and orientation of the pleat relative to the vehicle.

According to another aspect, alone or in combination with any other aspect, the CAB mount can include overlying plate portions configured to receive a connector for connecting the packaged CAB to the vehicle.

According to another aspect, alone or in combination with any other aspect, a first overlying plate portion can have a first support arm extending therefrom. The second overlying plate portion can have a second support arm extending therefrom. The second support arm together with the second overlying plate portion can define a recess for receiving the packaged CAB. The first support arm can extend over the packaged CAB received in the recess to hold the packaged CAB in the recess.

According to another aspect, alone or in combination with any other aspect, the CAB mount can include a plate portion configured to receive a connector for connecting the packaged CAB to the vehicle. The plate portion can be connected to the CAB and the anti-twist structure positioned within the CAB to fix the position and orientation of the anti-twist structure, and thus the packaged CAB, relative to the vehicle.

According to another aspect, alone or in combination with any other aspect, the CAB mount can further include a support arm extending from the plate portion. The support arm can extend around a portion of the packaged CAB and the anti-twist structure positioned within the CAB to fix the position and orientation of the anti-twist structure, and thus the packaged CAB, relative to the vehicle.

According to another aspect, alone or in combination with any other aspect, at least one airbag fastener can extend about the CAB mount and the packaged CAB to secure the packaged CAB to the CAB mount. The at least one airbag fastener can cooperate with the CAB mount to fix the position and orientation of the anti-twist structure, and thus the packaged CAB, relative to the vehicle.

According to another aspect, alone or in combination with any other aspect, the anti-twist structure can be positioned between a rolled/folded portion of the CAB and pleats of a +1 fold portion of the CAB. The CAB mount can extend about the CAB and the anti-twist structure.

According to another aspect, alone or in combination with any other aspect, the pleats of the +1 fold portion can be positioned between a portion of the CAB mount and the anti-twist structure so that the pleats of the +1 fold portion are grasped between the CAB mount and the anti-twist structure. Grasping the pleats of the +1 fold portion between the CAB mount and the anti-twist structure can fix the position and orientation of the pleats of the +1 fold portion relative to the vehicle. The rolled/folded portion of the CAB can be positioned between a portion of the CAB mount and the anti-twist structure so that the rolled/folded portion of the CAB is grasped between the CAB mount and the anti-twist structure. Grasping the rolled/folded portion of the CAB between the CAB mount and the anti-twist structure can fix the position and orientation of the rolled/folded portion relative to the vehicle.

According to another aspect, alone or in combination with any other aspect, the CAB mount can comprise a fabric mounting wrap that extends around the packaged CAB and the anti-twist structure positioned within the CAB to fix the position and orientation of the anti-twist structure, and thus the packaged CAB, relative to the vehicle. The fabric mounting wrap can be formed integrally with the CAB or formed separately from the CAB and stitched or otherwise connected to the CAB.

According to another aspect, alone or in combination with any other aspect, the apparatus can further include a CAB mount at each end of the anti-twist structure.

According to another aspect, alone or in combination with any other aspect, the CAB can further include an anti-twist pocket or sleeve for receiving the anti-twist structure.

According to another aspect, alone or in combination with any other aspect, the anti-twist structure can comprise an elongated member having a rigidity or stiffness greater than that of the CAB fabric.

According to another aspect, alone or in combination with any other aspect, the anti-twist structure can have a configuration that follows the architecture of the portion of the vehicle in which it is installed.

According to another aspect, alone or in combination with any other aspect, the anti-twist structure can comprise a bar having a generally rectangular cross-section.

According to another aspect, alone or in combination with any other aspect, the anti-twist structure can be constructed of metal or plastic, and wherein the CAB mount is constructed of metal, plastic, or fabric.

According to another aspect, alone or in combination with any other aspect, the CAB can be a one-piece woven CAB or a cut-and-sewn CAB.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 9 illustrates a schematic side view of the apparatus of FIG. 1, in an example use environment;

FIG. 10 is a magnified view of a portion of the apparatus depicted in FIG. 9;

FIG. 11 is a magnified view of a portion of the apparatus depicted in FIG. 9;

FIG. 18 is a schematic side view of an element of the apparatus of FIG. 1, including the element in a second configuration;

FIG. 19 is a sectional view of a portion of the element of FIG. 18;

FIG. 20 is a schematic, perspective, front side view of an element of the apparatus of FIG. 1, including the element in a third configuration;

FIG. 21 is a schematic rear view of the element of FIG. 20;

DETAILED DESCRIPTION OF THE INVENTION

As shown in FIGS. 1-37, the invention relates to an apparatus 10 for helping to protect an occupant of a vehicle. The apparatus 10 includes an anti-twist structure 12 and a curtain airbag ("CAB") 14 configured to cooperate with the anti-twist structure in order to inhibit twisting of the CAB, thereby eliminating the use of mounting straps. Although the anti-twist structure 12 is illustrated and described herein as being used with an OPW CAB 14, it should be appreciated that the anti-twist structure could also be implemented in a non-OPW CAB construction.

The CAB 14 is configured to receive the anti-twist structure 12, which forms a component of the CAB package 16. The anti-twist structure 12 acts as a backbone that controls the shape of the CAB package 16. The anti-twist structure 12 can control the CAB 14 shape both during rolling and/or folding and also while the CAB is in a packaged condition. The anti-twist structure 12 can thereby help prevent CAB 14 twisting during packaging and during installation. In some configurations, the vehicle into which the OPW CAB 14 is installed can be configured to include corresponding structures that receive and cooperate with the anti-twist structure 12 so that the packaged CAB 16 does not twist during installation. The anti-twist structure 12 is assembled with the CAB 14 and becomes part of the CAB package 16 that prevents CAB twisting during installation.

The anti-twist structure 12 has multiple benefits. The anti-twist structure 12 can be installed prior to folding of the CAB 14 to prevent twisting through the entire airbag packaging process and vehicle installation process. This anti-twist structure 12 serves as a backbone that is in-line with the CAB package 16 and eliminates issues of interference with other parts of the vehicle that often are encountered with the conventional mounting straps. The anti-twist structure 12 can also be shaped so that the backbone has a predefined shape configured to facilitate complex routing of the CAB 14 in the vehicle. The shape of the anti-twist structure 12 can also be configured to assist in the +1 roll/folding to maintain the fold height and position in the packaged condition of the CAB 14.

Figure 1:
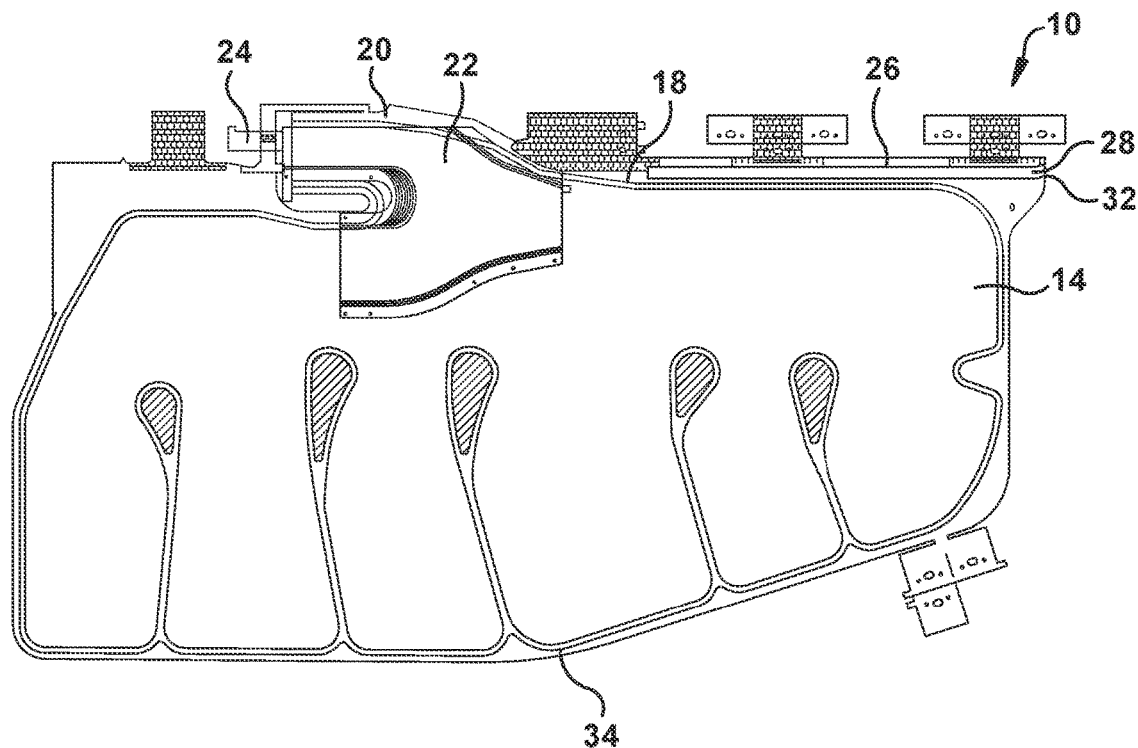
FIG. 1 is a schematic side view illustrating an apparatus for helping to protect an occupant of a vehicle.

An example configuration of a CAB 14 is illustrated in FIG. 1. As can be seen, the CAB 14 includes an upper portion 18 comprising a neck portion 20 along an upper left-center portion 22 of the CAB for receiving an inflator 24. To the right of the neck portion 20 is an upper edge portion 26 of the CAB 14 configured to cooperate with an anti-twist structure 12.

The CAB 14 is configured to include a portion for receiving the anti-twist structure 12, supporting the anti-twist structure, and connecting the anti-twist structure to the CAB. The CAB 14 can, for example, be configured to include an anti-twist pocket 28 (FIGS. 1-2) or anti-twist sleeve 30 (FIG. 23) for receiving the anti-twist structure 12. In the example configuration of FIGS. 1-2, the CAB 14 includes an anti-twist pocket 28. The anti-twist pocket 28 can include a single open end 32 for receiving the anti-twist structure 12. The CAB 14 can alternatively, or additionally, include an anti-twist sleeve 30 (FIG. 23) for receiving the anti-twist structure 12. The anti-twist sleeve 30 can include two oppositely disposed open ends 32 through which the anti-twist structure 12 can be received.

The anti-twist structure 12 is constructed to have a rigidity that is greater than that of the CAB 14 fabric, so that the CAB will conform to the anti-twist structure and be maintained in that conformed configuration. The anti-twist structure 12 can, for example, be in the form of a bar or rod having, for example, a rectangular or generally rectangular cross-section. The anti-twist structure 12 can be formed to follow a straight configuration (FIGS. 2 and 10) or a curved, bent, or angled configuration (FIG. 11) in order to conform with a predetermined CAB 14 shape and/or vehicle architecture.

The anti-twist structure 12 can have any material construction, such as plastic or metal, that is selected such that the appropriate rigidity is maintained. For example, the anti-twist structure 12 can be a metal bar with a generally rectangular cross-section that is inserted into the anti-twist pocket or sleeve 28, 30. As another example, the anti-twist structure 12 can be a plastic bar with a generally rectangular cross-section that is inserted into the anti-twist pocket or sleeve 28, 30.

The anti-twist pocket or sleeve 28, 30 allows an operator to place the anti-twist structure 12 into the CAB 14 without a separate sewing operation or additional fabric. The anti-twist structure 12 could be constructed of any material and geometry that has a high resistance to twisting. The size of anti-twist structure 12 can be made very small in cases where pleat/+1 fold control and other deployment factors are not desired. This reduces the cost of anti-twist structures 12 and the cost impact associated with increased CAB 14 height.

Figure 3:
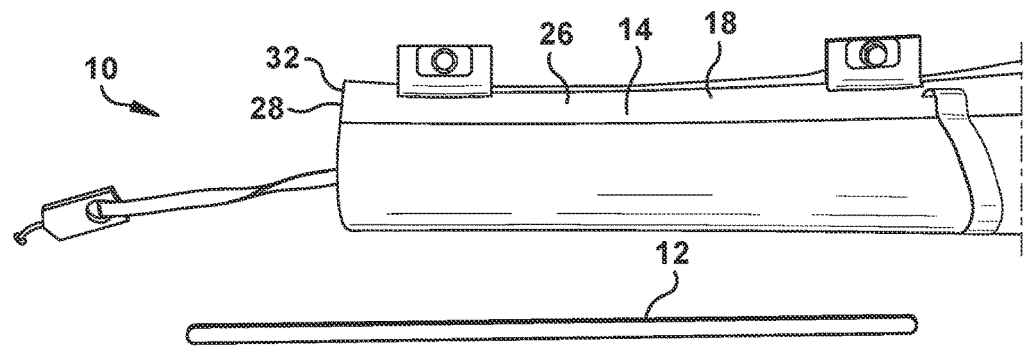
FIGS. 3-6 illustrate a method for packaging a portion of the apparatus of FIG. 1.
Figure 4:
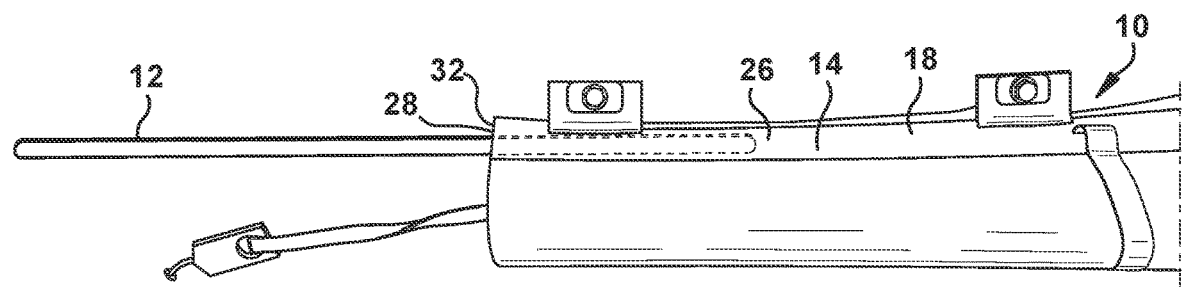
Figure 5:
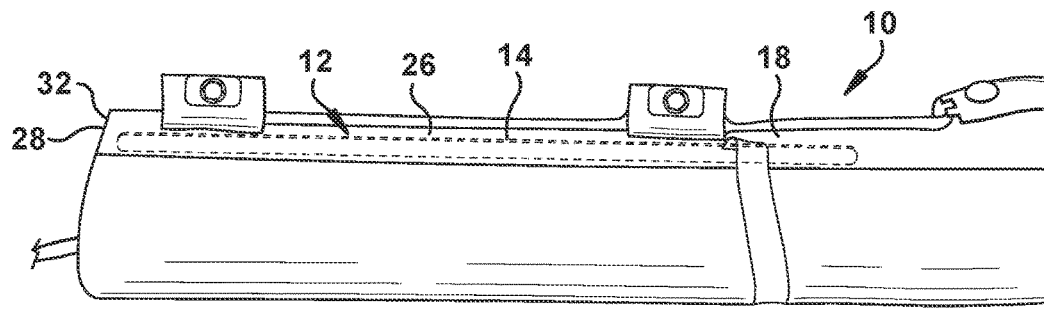
Figure 6:
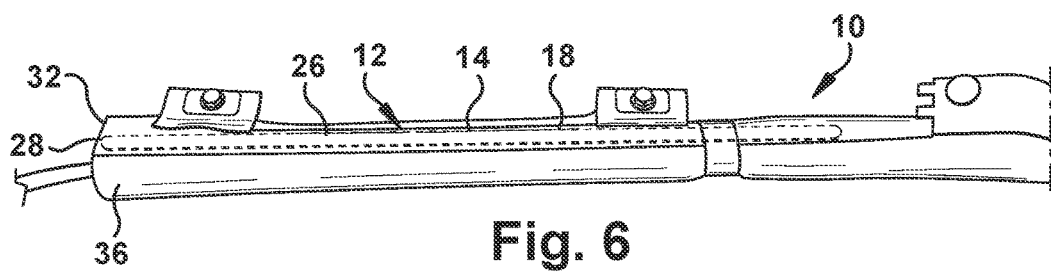

FIGS. 3-6 illustrate a portion of the packaging procedure of the CAB 14. FIG. 3 depicts the CAB 14 in a condition where the CAB is rolled up from a bottom edge 34 of the CAB (see FIG. 1), prior to implementing the flip-fold 36 in a +1 roll-fold CAB package configuration. As shown in FIG. 4, the anti-twist structure 12 is inserted into the anti-twist pocket 28. FIG. 5 depicts the CAB 14 after the anti-twist structure 12 is fully inserted into the anti-twist pocket 28. As shown in FIG. 6, with the anti-twist structure 12 fully installed, the flip-fold 36 can be completed. Advantageously, the presence of the anti-twist structure 12 facilitates handling the upper portion 18 of the CAB 14 during the fold so that flip-folds 36 can be implemented along the entire length of the CAB. This helps prevent twisting during the flip-fold portion of the packaging procedure.

Figure 7:
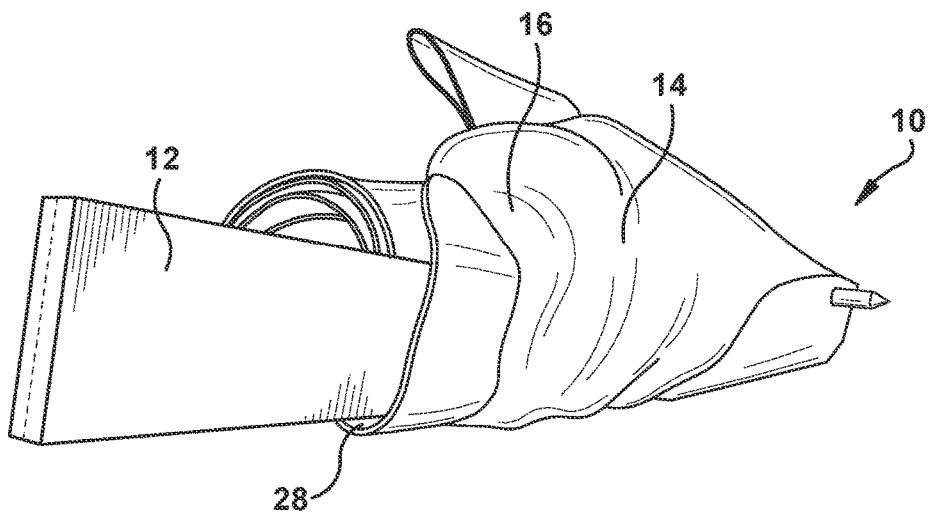
FIGS. 7-8 illustrate example packaged configurations for the apparatus of FIG. 1.
Figure 8:
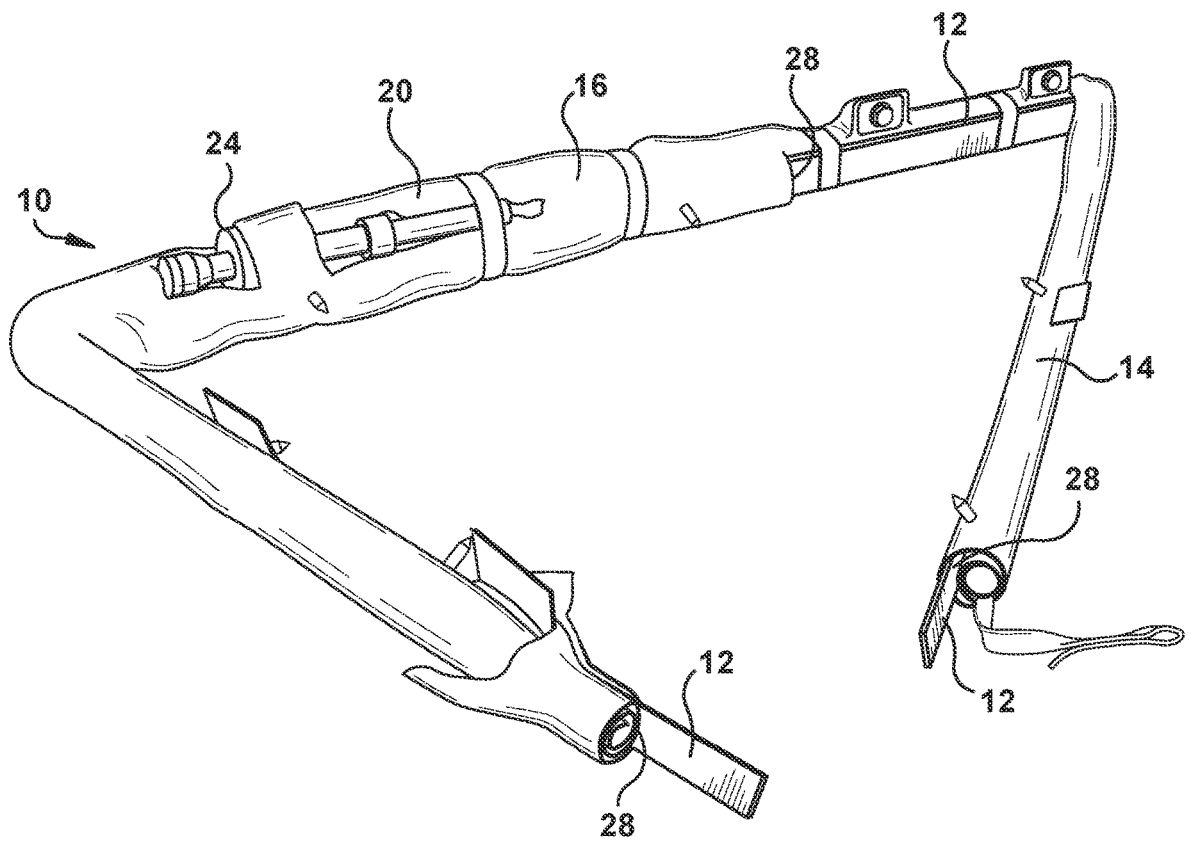

The anti-twist structure 12 can be configured to define the shape of the CAB package 16 and to control the routing of the CAB package during installation. The CAB 14 can be configured with multiple anti-twist pockets and/or sleeves 28, 30 for receiving multiple anti-twist structures 12, each of which has a configuration selected to facilitate CAB package 16 installation given the surrounding vehicle structure. Advantageously, implementing multiple anti-twist structures 12 can allow for the CAB package 16 to be folded lengthwise for shipping in order to minimize shipping packaging space, as shown in FIGS. 7-8.

FIG. 9 illustrates a vehicle side structure 38 of a vehicle 40 that includes two areas, along an A-pillar 42 and a D-pillar 44, where an anti-twist structure 12 helps prevent twisting during CAB package 16 installation. These regions 42, 44 are shown in FIGS. 10-11, along with the respective anti-twist structures 12 used to install their respective portions of the CAB package 16 in the vehicle 40. As shown in FIG. 10, the shape of the anti-twist structure 12 helps install the CAB package 16 along a generally straight portion 46 of the A-pillar 42. As shown in FIG. 11, the shape of the anti-twist structure 12 helps install the CAB package 16 along a generally curved placement along a roof rail 48 and the D-pillar 44 of the vehicle 40. In both situations shown in FIGS. 10-11, the CAB 14, being packaged tightly around their respective anti-twist structures 12, is highly resistant to twisting during assembly and installation.

Figure 12:
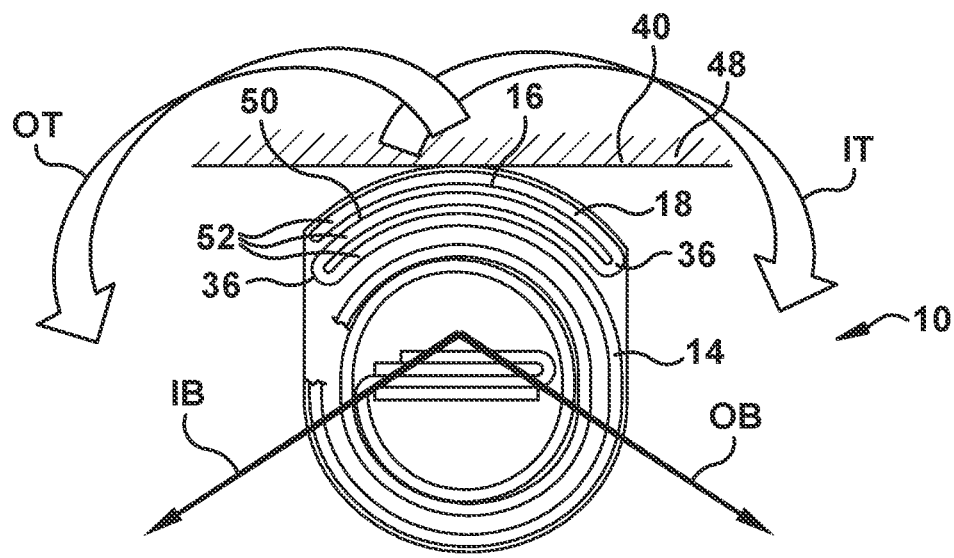
FIG. 12 is a schematic front view of the apparatus of FIG. 1, in an example use environment.

As shown in FIGS. 12, a +1 fold portion 50 can be added to the folding/rolling of the CAB 14 to help define or control the trajectory of the CAB during deployment. The +1 fold portion 50 includes folds 36 in the upper portion 18 of the CAB 14 that form pleats 52 of CAB material. The +1 fold portion 50 is sensitive to the angular position and orientation of the pleats 52 within the +1 fold portion. If the pleats 52 rotate, i.e., twist on the rolled CAB 14, then the trajectory of the CAB deployment can be shifted or redirected outboard, indicated by arrow "OB", or inboard, indicated by arrow "IB". A rotation or twisting of the +1 fold portion 50 relative to the remainder of the CAB package 16 affects the deployment trajectory of the CAB 14. Inboard twisting, indicated by arrow "IT", results in CAB 14 deployment being shifted inboard IB. Similarly, outboard twisting, indicated by arrow "OT", results in CAB 14 deployment being shifted outboard OB.

Figure 13:
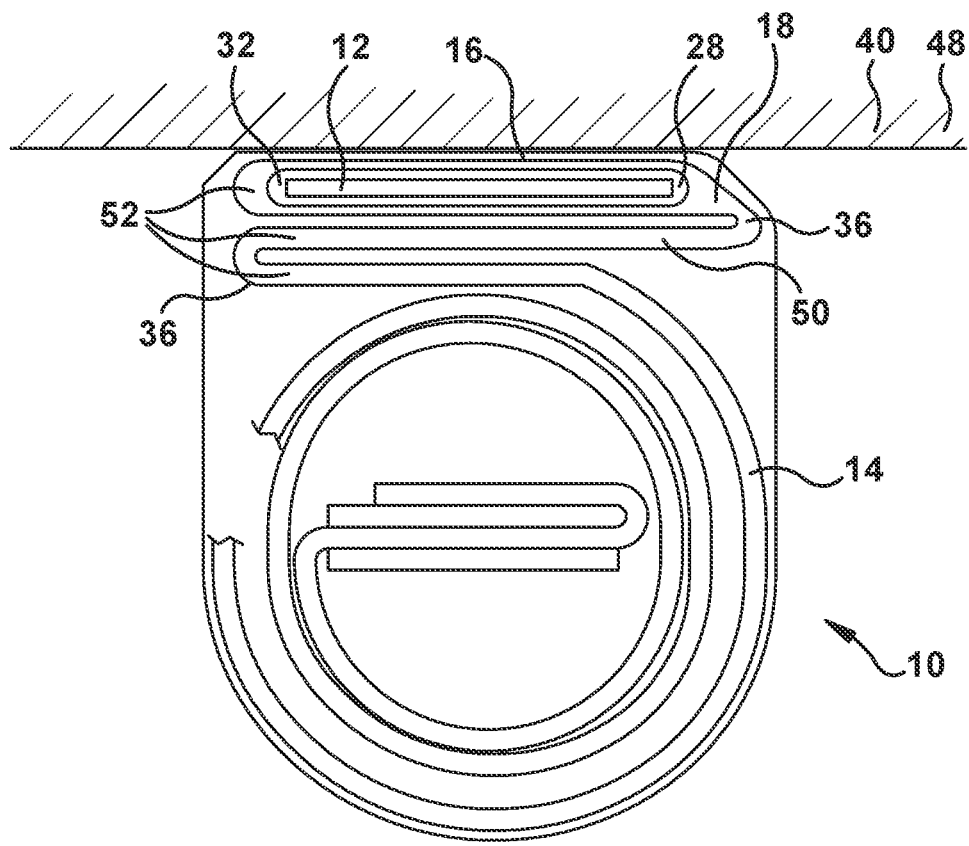
FIG. 13 is a schematic front view of the apparatus of FIG. 1, in an example use environment and in a first configuration.
Figure 14:
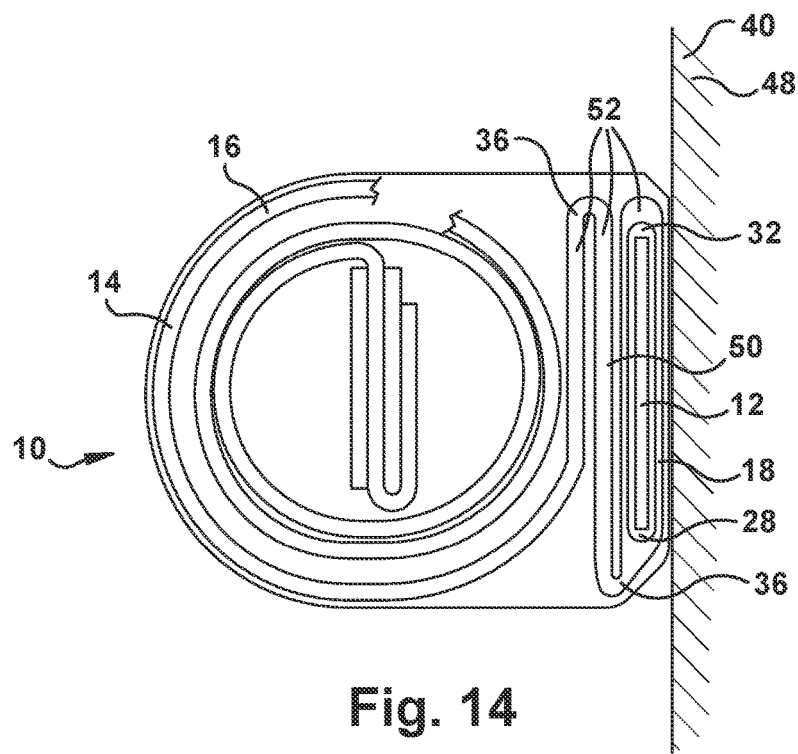
FIG. 14 is a schematic front view of the apparatus of FIG. 1, in an example use environment and in a second configuration.

FIG. 13 depicts a top-mounted configuration of a CAB package 16 where the CAB has a +1 fold portion 50. FIG. 14 depicts a side-mounted configuration of a CAB package 16 where the CAB 14 has a +1 fold portion 50. As shown in FIGS. 13-14, the anti-twist structures 12 are included in the +1 fold portions 50. The anti-twist structures 12 extending through the +1 fold portions 50 tend to cause the +1 fold portions to assume a generally flattened configuration that coincides with the configurations of the anti-twist structures.

Since the CAB 14 is flexible, the pleats 52 could shift between mounting features of the apparatus 10. Accordingly, and advantageously, the apparatus 10 can include CAB mounts 54, e.g., clamps brackets, or fabric wraps, that are configured to include features that cooperate with the anti-twist structure 12 to help ensure that the CAB package 16, particularly the +1 fold portion 50, is maintained in the desired position and orientation relative to the vehicle structure. The CAB mounts 54 are also configured to extend about and support the CAB package 16 in the vehicle 40. Implementing multiple CAB mounts 54, along the length of the anti-twist structure 12, such as one at each end, can thereby fix the position and orientation not only of the CAB 14 portions engaged by the CAB mounts, but all portions of the CAB in between the CAB mounts. The CAB mounts 54 can be constructed of metal, plastic, fabric, or any other appropriate material.

Figure 15:
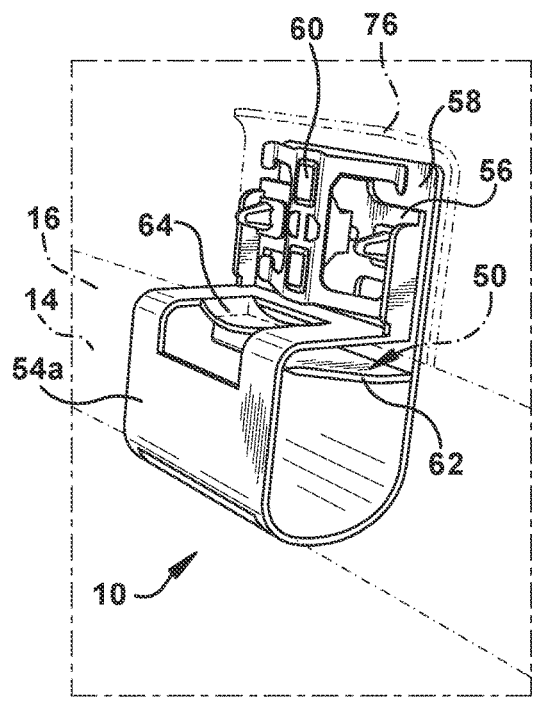
FIG. 15 is a schematic, perspective, front side view of an element of the apparatus of FIG. 1, including the element in a first configuration.
Figure 16:
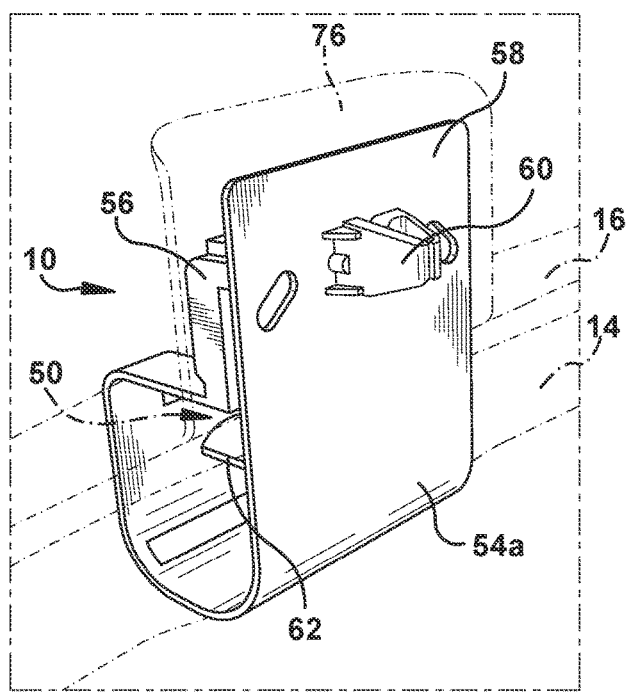
FIG. 16 is a schematic, perspective, rear side view of the element of FIG. 15.
Figure 17:
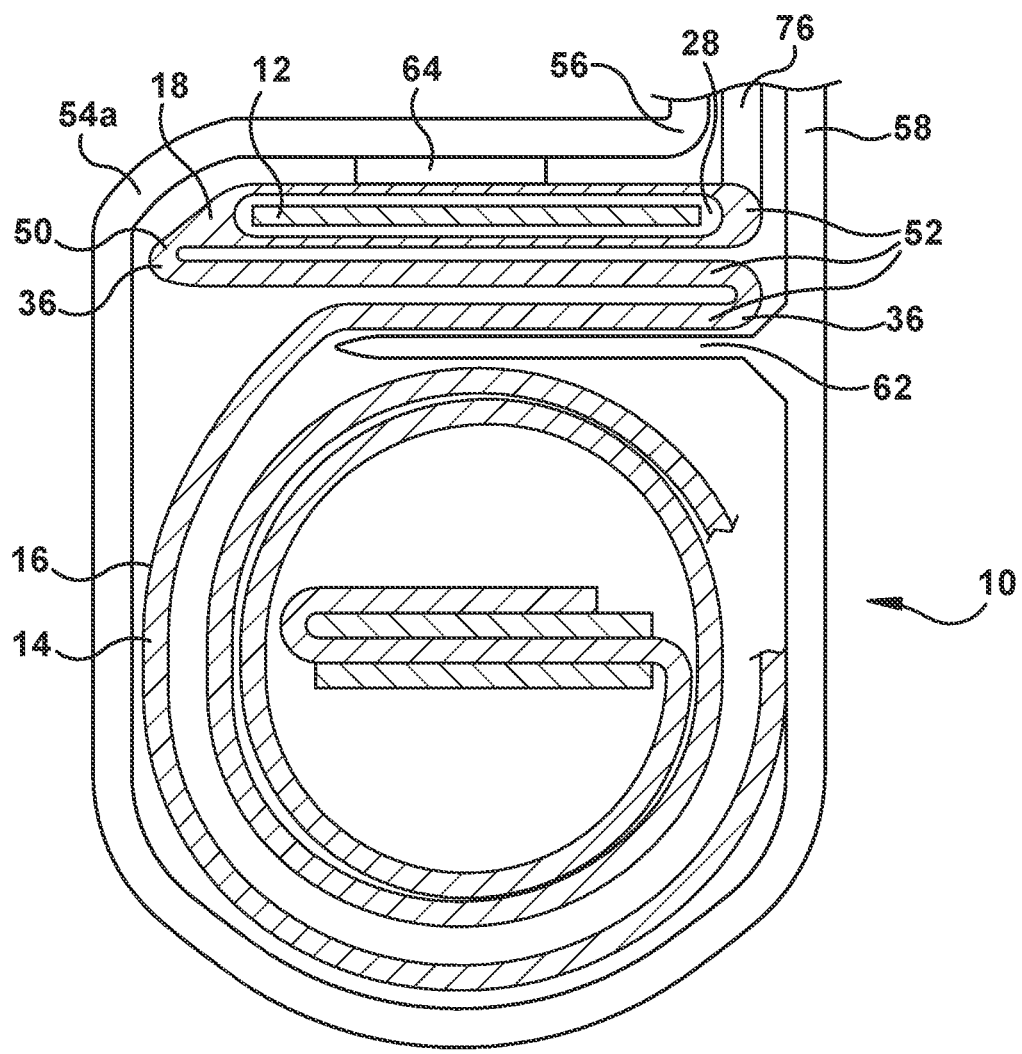
FIG. 17 is a schematic front view of the element of FIG. 15.

FIGS. 15-17 depicts an example CAB mount 54 in the form of a first mounting bracket 54a that cooperates with the anti-twist structure 12. As shown, the mounting first bracket 54a extends around the CAB package 16 and includes overlying plate portions 56, 58 through which a connector 60 extends to connect the mounting bracket and the CAB package to the vehicle 40. The first mounting bracket 54a can include a fin 62 and a detent 64 for supporting the pleats 52 of the +1 fold portion 50 of the CAB 14. For example, as shown in FIG. 17, the fin 62 and the detent 64 are positioned on opposing sides of the +1 fold portion 50, and thus the pleats 52 of the +1 fold portion, and grasp the +1 fold portion between the fin and the detent to support the pleats. As shown in FIG. 17, since the anti-twist structure 12 is included in the +1 fold portion 50, it can be grasped between the detent 64 and the fin 62.

FIGS. 18-19 depict another example CAB mount 54 in the form of a second mounting bracket 54b that cooperates with the anti-twist structure 12. As shown, the second mounting bracket 54b extends around the CAB package 16 and includes overlying plate portions 88, 90 through which a connector 60 extends to connect the second mounting bracket and the CAB package to the vehicle 40. The first overlying plate portion 88 of the second mounting bracket 54b has a first support arm 92 extending therefrom. The second overlying plate portion 90 of the second mounting bracket 54b has a second support arm 94 extending therefrom. The second support arm 94 has a first portion 96 that extends parallel to the first support arm 92 of the first overlying plate portion and a second portion 98 that extends generally transverse to the first portion of the second support arm.

As shown in FIG. 19, the packaged CAB 16 is supported on four sides by the first support arm 92, the second support arm 94, and the second overlying plate portion 90. The packaged CAB 16 is at least partially received in a recess 100 defined by the first portion 96 of the second support arm 94, the second portion 98 of the second support arm, and the second overlying plate portion 90. The first support arm 92 extends over a portion of the packaged CAB 16 received in the recess 100 and acts as a lid that helps hold the packaged CAB in the recess. This configuration helps to hold the position and orientation of the packaged CAB 16 positioned within the second mounting bracket 54b relative to the vehicle 40. Further, at least a portion of the anti-twist structure 12 is positioned between, and thus functionally grasped by, the first and second support arms 92, 94. By grasping the anti-twist structure 12 between the first and second support arms 92, 94, the second mounting bracket helps fix the position and orientation of the anti-twist structure 12 relative to the vehicle 40.

FIGS. 20-21 depict another example CAB mount 54 in the form of a third mounting bracket 54c that cooperates with the anti-twist structure 12. As shown, the third mounting bracket 54c extends around the CAB package 16 and includes a plate portion 102 through which a connector 60 extends to connect the third mounting bracket and the CAB package to the vehicle 40. The plate portion 102 includes a support arm 104 transversely extending therefrom. The support arm 104 can have an arcuate configuration. The support arm 104 extends around a portion of the packaged CAB 16. At least one airbag fastener 106, such as airbag packaging tape or an airbag fastening band, can extend about the plate portion 102, the support arm 104, and the packaged CAB 16 to help secure the packaged CAB to the third mounting bracket 54c.

As shown in FIGS. 20-21, the packaged CAB 16 is supported on at least two sides by the plate portion 102 and the support arm 104 of the third mounting bracket 54c. This configuration helps to hold the position and the orientation of the CAB package 16. The support arm 104, arcuately extending over the rounded CAB package 16 further helps to hold the CAB package's shape, position, and orientation. The at least one airbag fastener 106 extending about the plate portion 102, the support arm 104, and the packaged CAB 16 cooperates with the third mounting bracket 54c to help fix the position and orientation of the packaged CAB.

The support arm 104 and the at least one airbag fastener 106 also help support the pleats 52 of the +1 fold portion 50 of the CAB 14. As shown in FIGS. 20-21, the support arm 104 and the at least one airbag fastener 106 hold at least a portion of the +1 fold portion 50, and thus the pleats 52 of the +1 fold portion, generally parallel to the plate portion 102. Since the anti-twist structure 12 is included in the +1 fold portion 50, it is also held generally parallel to the plate portion 102. By holding the +1 fold portion 50 and the anti-twist structure 12 in this manner, the support arm 104 and the at least one airbag fastener 106 help fix the position of the anti-twist structure and the pleats 52 of the +1 fold portion of the CAB 14 relative to the vehicle 40.

Figure 22:
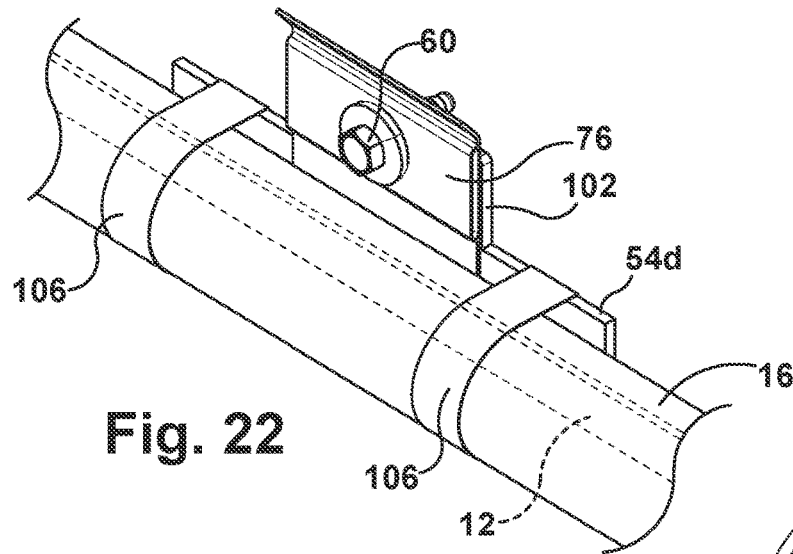
FIG. 22 is a schematic, perspective, front side view of an element of the apparatus of FIG. 1, including the element in a fourth configuration.
Figure 23:
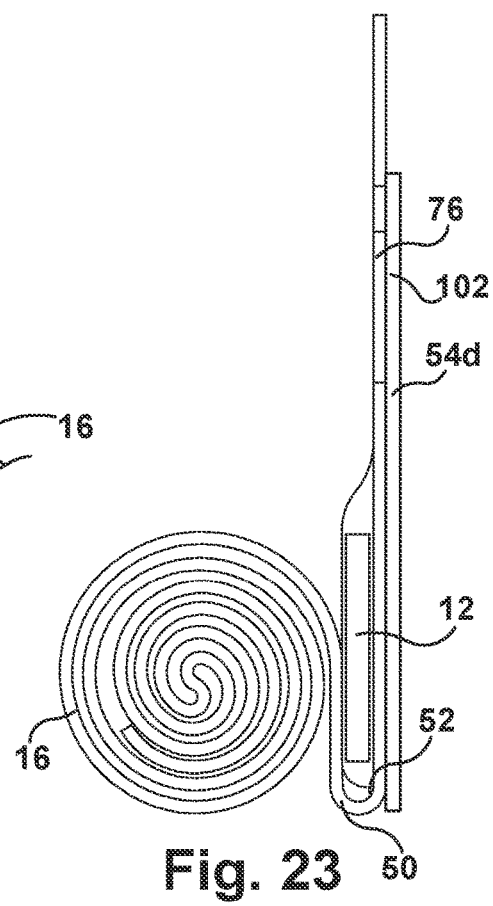
FIG. 23 is a schematic rear view of the element of FIG. 22.

FIGS. 22-23 depict another example CAB mount 54 in the form of a fourth mounting bracket 54d that cooperates with the anti-twist structure 12. The fourth mounting bracket 54d has substantially the same configuration and function as the third mounting bracket 54c, except that the fourth mounting bracket does not include the support arm 104 of the third mounting bracket.

Figure 24:
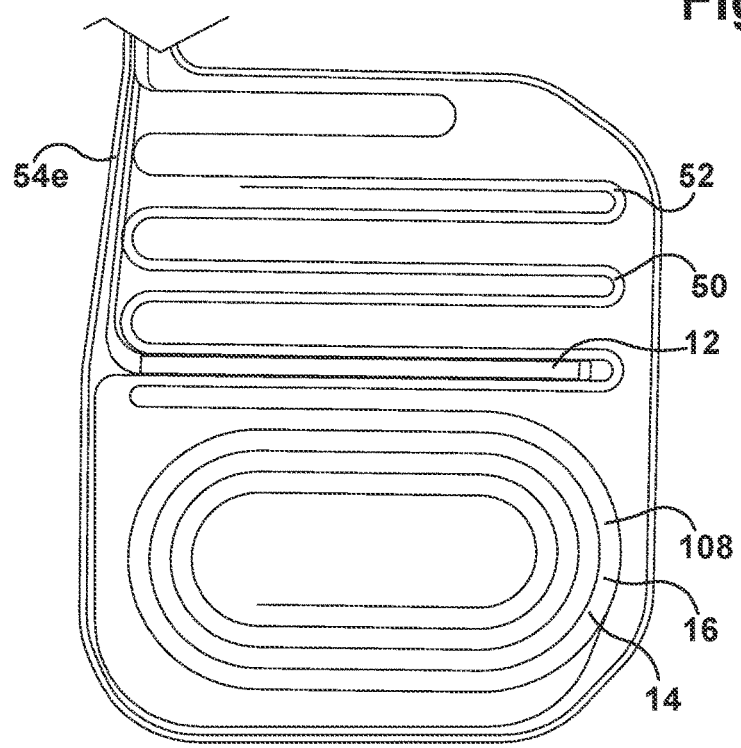
FIG. 24 is a schematic rear view of an element of the apparatus of FIG. 1, including the element in a fifth configuration.

FIG. 24 depicts another example CAB mount 54 in the form of a fifth mounting bracket 54e that cooperates with the anti-twist structure 12. The fifth mounting bracket 54e has substantially the same configuration as the first mounting bracket 54a, except that the fourth mounting bracket does not include the fin 62 or the detent 64 of the third mounting bracket. As shown in FIG. 24, the CAB 14 can be rolled/folded/manipulated such that the anti-twist structure 12 is positioned between a rolled/folded portion 108 of the CAB and the pleats 52 of the +1 fold portion 50. The fifth mounting bracket 54e can then wrapped about the CAB 14 and the anti-twist structure 12.

Figure 25:
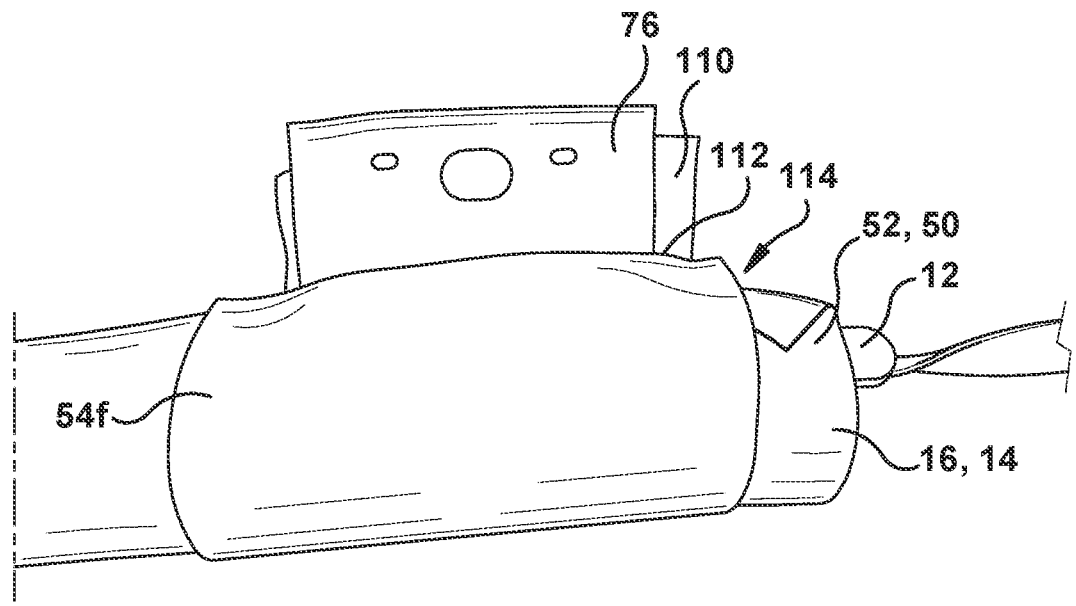
FIG. 25 is a schematic side view of an element of the apparatus of FIG. 1, including the element in a sixth configuration.

By extending around the CAB package 16, the fifth mounting bracket 54e help holds the CAB package's 16 shape, position, and orientation relative to the vehicle 40. Further, the fifth mounting bracket 54e, by extending about the CAB package 16, also helps to fix the position and orientation of the pleats 52 of the +1 fold portion 50 of the CAB 14 and the anti-twist structure 12 relative to the vehicle 40 since the anti-twist structure is included in the +1 fold portion. As shown in FIG. 25, the pleats 52 of the +1 fold portion 50 is positioned between a portion of the fifth mounting bracket 54e and the anti-twist structure 12, and thus is functionally grasped by the fifth mounting bracket and the anti-twist structure. Grasping the pleats 52 of the +1 fold portion 50 helps fix the position and orientation of the pleats of the +1 fold portion relative to the vehicle 40. Further, the rolled/folded portion 108 of the CAB 14 is positioned between a portion of the fifth mounting bracket 54e and the anti-twist structure 12, and thus is functionally grasped by the fifth mounting bracket and the anti-twist structure. Grasping the rolled/folded portion 108 of the CAB 14 helps fix the position and orientation of the rolled/folded portion relative to the vehicle 40.

FIGS. 25-28 depict another example CAB mount 54 in the form of a fabric mounting wrap 54f that cooperates with the anti-twist structure 12. The fabric mounting wrap 54f can be wrapped around the packaged CAB 16 and then stitched or otherwise connected to maintain its wrapped position. By extending around the CAB package 16, the fabric mounting bracket 54f help holds the CAB package's 16 shape, position, and orientation relative to the vehicle 40. Further, the fabric mounting wrap 54f, by extending about the CAB package 16, also helps to fix the position and orientation of the pleats 52 of the +1 fold portion 50 of the CAB 14 and the anti-twist structure 12 relative to the vehicle 40 since the anti-twist structure is included in the +1 fold portion.

Figure 26:
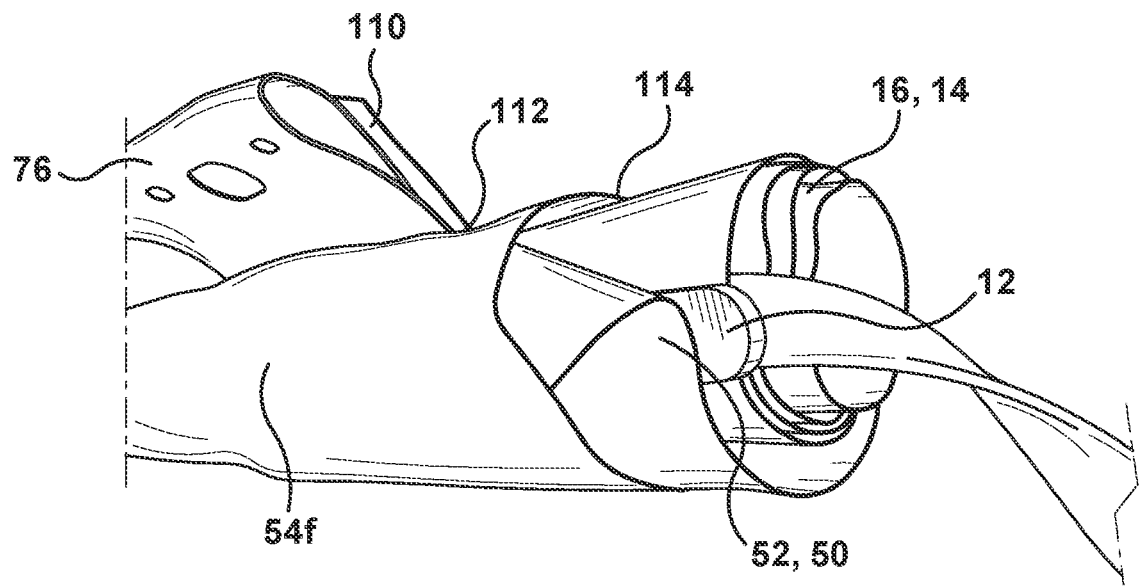
FIG. 26 is a schematic, perspective, front side view of the element of FIG. 25.

The fabric mounting wrap 54f can be integrally formed with the CAB 14 or can be formed separately and connected to the CAB. FIGS. 25-26 depict a fabric mounting wrap 54f that is formed separately from the CAB 14. In this configuration, the fabric mounting wrap 54f has a first end 110 that is wrapped about the CAB package 16 and extends through a slit opening 112 in another portion of the fabric mounting wrap, such as in a second end 114 of the fabric mounting wrap, to help secure the fabric mounting wrap about the packaged CAB. Once wrapped, a connector 60 can extend through the first end 110 of the fabric mounting wrap 54f to connect the fabric mounting wrap and the CAB package 16 to the vehicle 40. The second end 114 of the fabric mounting wrap 54f can be stitched or otherwise connected to another portion of the fabric mounting wrap to help secure the fabric mounting wrap about the packaged CAB 16.

Figure 27:
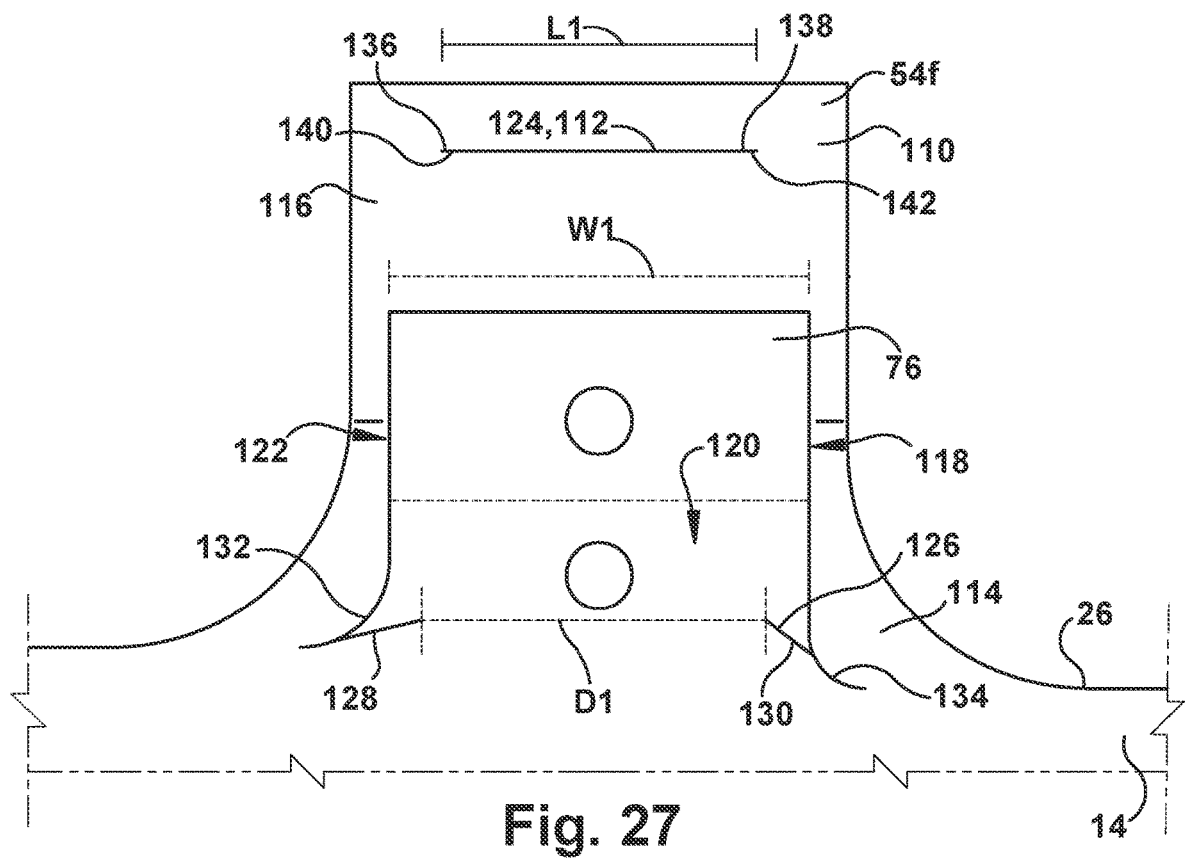
FIG. 27 is a schematic side view of the element of FIG. 25, including the element in an alternate configuration.
Figure 28:
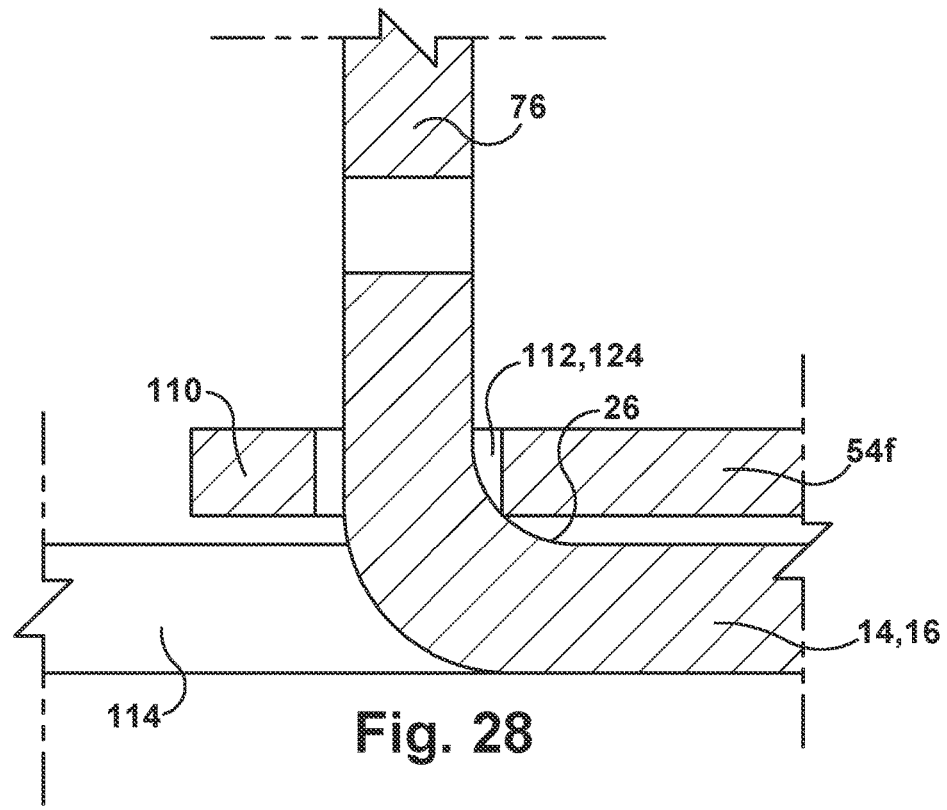
FIG. 28 is a schematic rear view of a portion of the element of FIG. 27, including the element in an example use condition.

FIGS. 27-28 depicts an example fabric mounting wrap 54f that is integrally formed with the CAB 14. The fabric mounting wrap 54f is formed integrally woven portion of the CAB 14, which takes the form of a fabric extension 116 of the upper edge portion 26 of the CAB. The fabric mounting wrap 54f has a free first end 110, and an opposite second end 114 where the fabric mounting wrap merges with the upper edge portion 26 of the CAB 14. An associated mounting feature 76, such as a mounting tab, comprises a portion of the fabric extension 116 that forms the fabric mounting wrap 54f. Therefore, both the mounting feature 76 and the fabric mounting wrap 54f comprise an integral woven portion of the CAB 14 formed from the same fabric extension 116 of the upper edge portion 26 of the CAB. The mounting feature 76 is defined by a slit 118 that is cut through the fabric extension 116 and separates the mounting feature from the fabric mounting wrap 54f. Thus, as shown in FIG. 27, the mounting feature 76 comprises a central portion 120 of the fabric extension 116, and the fabric mounting wrap 54f comprises a portion of the fabric extension that extends along a periphery 122 of the mounting feature. A connector 60 can extend through the mounting feature 76 to connect the fabric mounting wrap 54f and the CAB package 16 to the vehicle 40.

The fabric mounting wrap 54f can be configured to be attached to the CAB 14 along the upper edge portion 26 of the CAB after being wrapped about the circumference of the rolled and/or folded CAB. To accomplish this attachment, the first end 110 of the fabric mounting wrap 54f can comprise a retention feature 124 configured to cooperate with an attachment feature 126 positioned at the upper edge portion 26 of the CAB 14. The retention feature 124 and the attachment feature 126 can both be formed from the CAB fabric, such as from a portion of the fabric extension 116 that forms the fabric mounting wrap 54f and the mounting feature 76. In the example configuration of FIGS. 27-28, the retention feature 124 comprises a slit opening 112 in the first end 110 of the fabric mounting wrap 54f, and the attachment feature 126 comprises edge slits 128, 130 formed in opposite edges 132, 134 of the mounting feature 76. The slit opening 112 has a length L1 that is shorter than a width W1 of the mounting feature 76. The edge slits 128, 130 are configured such that they terminate at a distance D1 from each other that is about equal to the length L1 of the slit opening 112.

As shown in FIG. 28, after the fabric mounting wrap 54f is wrapped around the circumference of the packaged CAB 16, the mounting feature 76 is passed through the slit opening 112 in the first end 110 of the fabric mounting wrap. Although the width W1 of the mounting feature 76 is longer than the length L1 of the slit opening 112, the mounting feature is able to be passed through the slit opening because of the flexible nature of the fabric extension 116 that forms the mounting feature. When the mounting feature 76 is passed through the slit opening 112, retention portions 136, 138 (FIG. 27) of the fabric mounting wrap 54f at opposite ends 140, 142 of the slit opening are received in the edge slits 128, 130 to secure the first end 110 of the fabric mounting wrap to the mounting feature.

Figure 2:
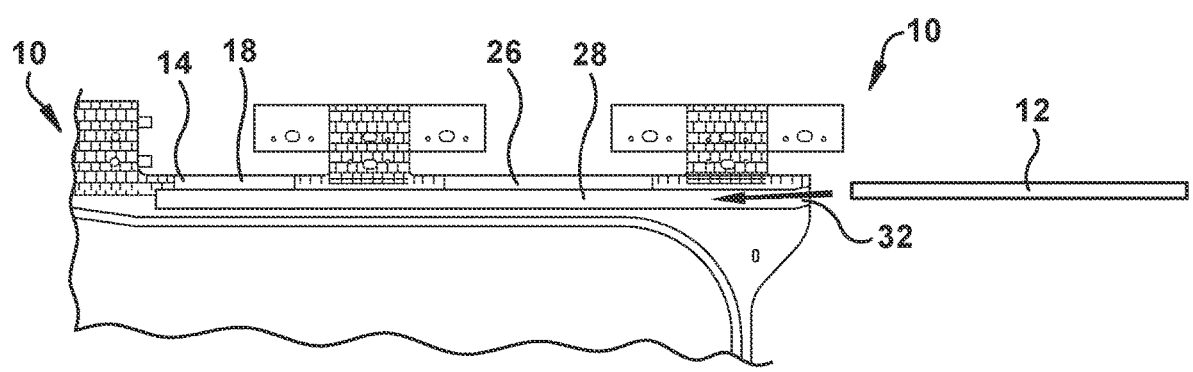
FIG. 2 is a schematic side view of a portion of the apparatus of FIG. 1, in a first configuration.
Figure 29:
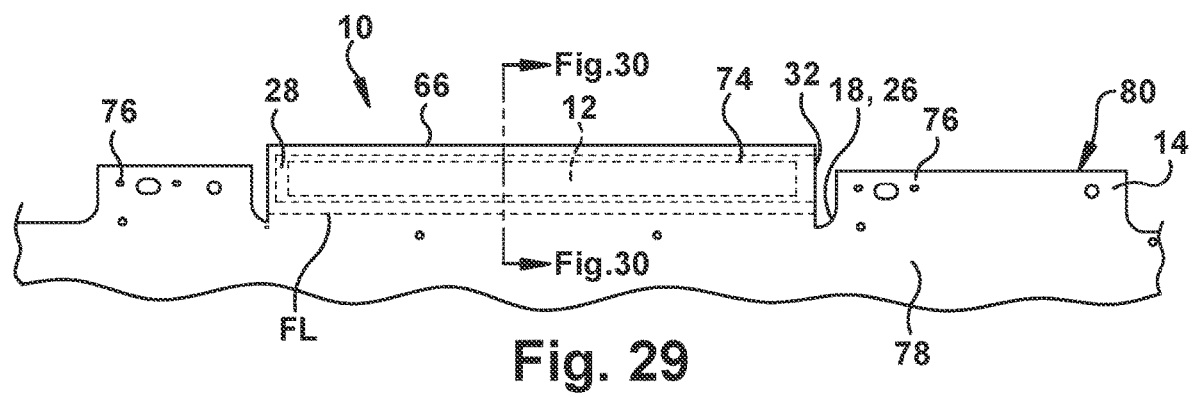
FIGS. 29-31 illustrate a method for assembling a portion of the apparatus of FIG. 1, with the apparatus in a second configuration.
Figure 30:
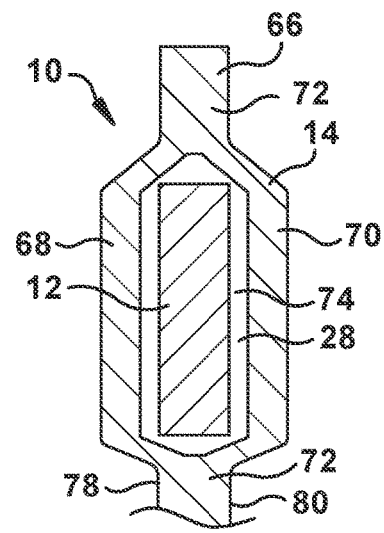
Figure 31:
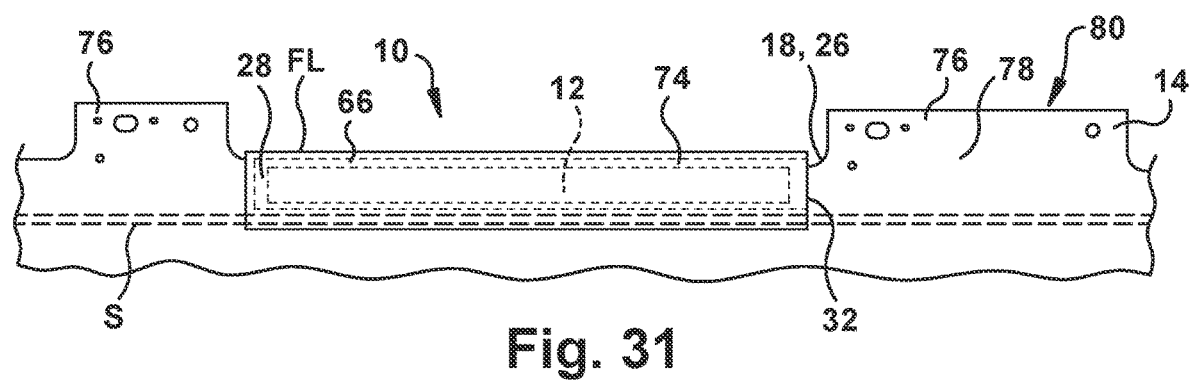

In a OPW CAB 14 construction, the anti-twist pockets and/or sleeves 28, 30 can be integrated easily into the CAB construction by simply weaving the sleeve/pocket along the upper portion 18, such as the upper edge portion 26, of the OPW CAB (FIGS. 1-2). Alternatively, or additionally, the anti-twist pockets and/or sleeves 28, 30 can take the form of a fabric extension 66 of the upper portion 18, such as the upper edge portion 26, of the OPW CAB 14. The fabric extension 66 forming the anti-twist pockets and/or sleeves 28, 30 can comprise two simultaneously woven fabric layers 68, 70 of the OPW CAB 14 that are interwoven in portions to form seams 72 that define a cavity 74 configured to receive the anti-twist structure 12. FIGS. 29-30 depict an anti-twist pocket 28 that takes the form of a fabric extension 66 of the upper edge portion 26 of the OPW CAB 14 that extends between mounting features 76 of the apparatus 10. Once the anti-twist structure 12 has been inserted into the cavity 74, the anti-twist pocket or sleeve 28, 30, can be folded over a fold line FL onto an outboard side 78 of the OPW CAB 14, an inboard side 80 of the OPW CAB, or folded such that it is between the outboard and inboard sides. The folded anti-twist pocket or sleeve 28, 30 can be sewn or otherwise connected to the OPW CAB 14. FIG. 31 depicts the anti-twist pocket 28, which includes the anti-twist structure 12 therein, folded over the fold line FL and sewn to an outboard side 78 of the OPW CAB 14.

Figure 32:
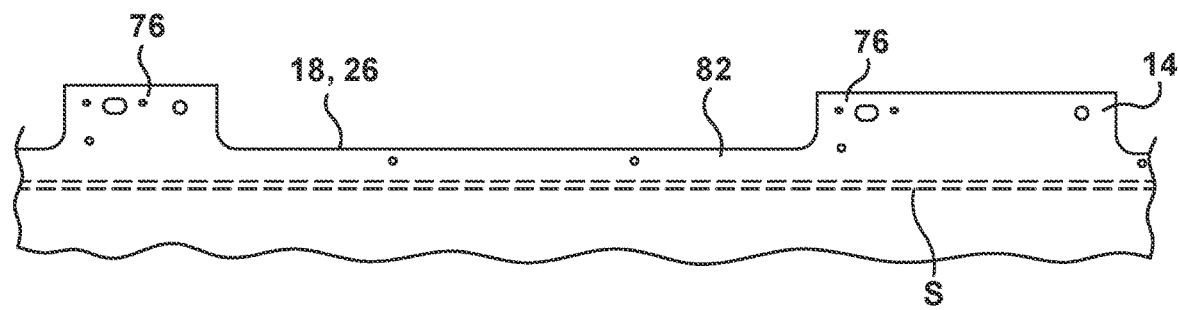
FIGS. 32-37 illustrate a method for assembling a portion of the apparatus of FIG. 1, with the apparatus in a third configuration.
Figure 33:
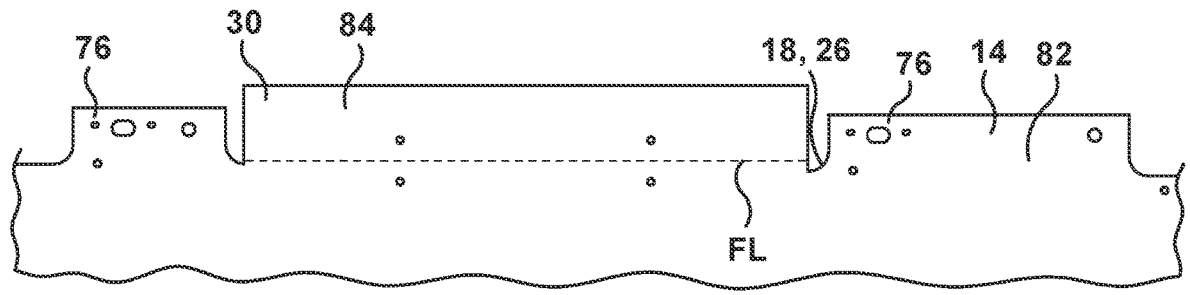
Figure 34:
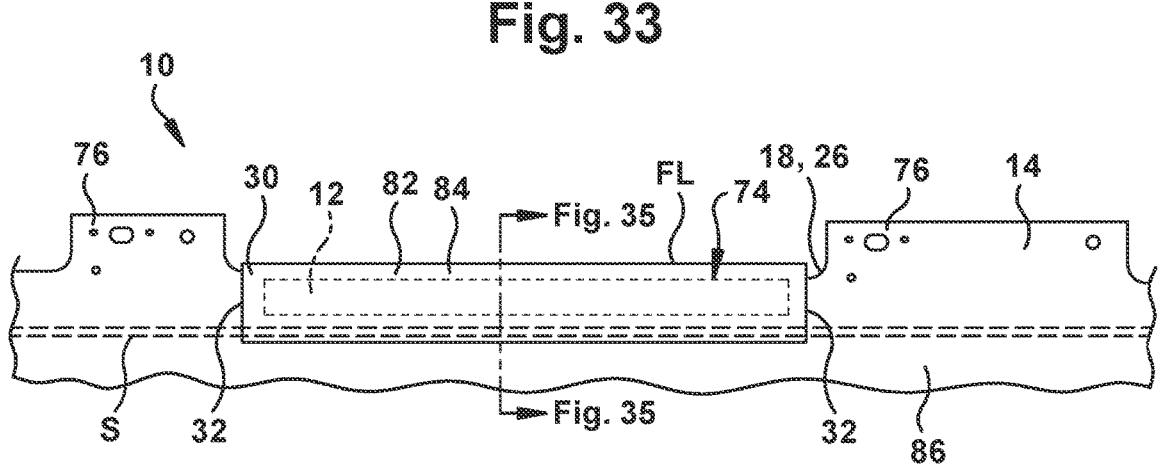
Figure 35:
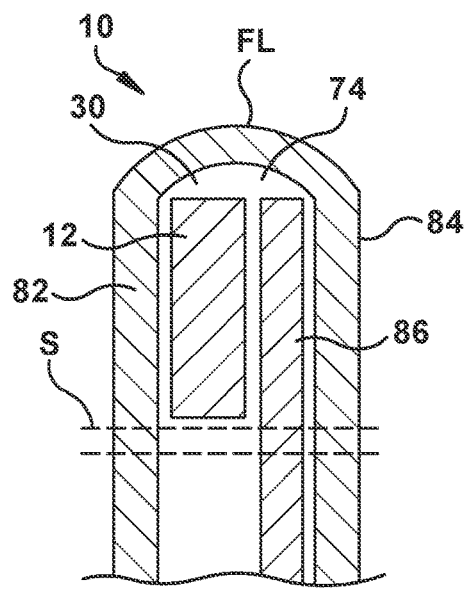

For a two panel, cut-and-sewn CAB 14 construction, the anti-twist pocket or sleeve 28, 30 must be added. One such manner in which this can be achieved is in FIGS. 32-37. The upper edge portion 26 of an inboard panel 82 of the two panel CAB 14 is shown in FIG. 32. This two panel CAB 14 has mounting features 76 spaced along at least the upper edge portion 26 of the two panel CAB. The same inboard panel 82 with an anti-twist sleeve 30 added is shown in FIG. 33. As shown in FIG. 33, the anti-twist sleeve 30 at this stage is a single layer, fabric extension 84 of the upper edge portion 26 of the two panel CAB 14 that extends between the mounting features 76. A fold line FL is shown in dashed lines in FIG. 16. As shown in FIGS. 34-35, an outboard panel 86 is placed on top of the inboard panel 82. The anti-twist sleeve 30 on the inboard panel 82 is folded over the fold line FL to overlay the outboard panel 86. The folded anti-twist sleeve 30 can then be stitched to the outboard panel 86 to define the cavity 74 between the fabric extension 84 that forms the anti-twist sleeve and the outboard panel. Stitching S interconnects the inboard panel 82, the outboard panel 86, and the folded-over anti-twist sleeve 30 to each other. This allows for the formation of the anti-twist sleeve 30 without additional stitching, as the same stitching that forms an outer peripheral seam of the two panel CAB 14 can also form the anti-twist sleeve.

Figure 36:
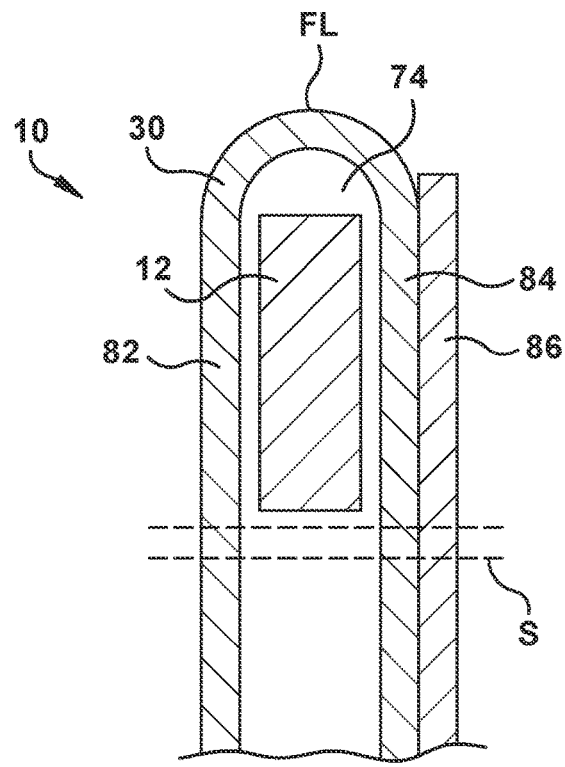

Once the anti-twist sleeve 30 is folded and stitched, the anti-twist structure 12 can be inserted into the cavity 74 through one of the open ends 32 of the anti-twist sleeve. Although the anti-twist sleeve 30 is shown as being formed on the inboard panel 82, it could be formed on the outboard panel 86. Additionally, the anti-twist sleeve 30 can be folded over so that it overlies the panel 82, 86 from which it was formed or so that it overlies the other panel. As shown in FIG. 36, the anti-twist sleeve 30 can also be folded over so that it lies between the inboard and outboard panels 82, 86. This allows a sewing foot of a sewing machine to have a continuous surface for stitching the inboard and outboard panels 82, 86 together to form the anti-twist sleeve 30 and/or the outer peripheral seam of the two panel CAB 14.

Figure 37:
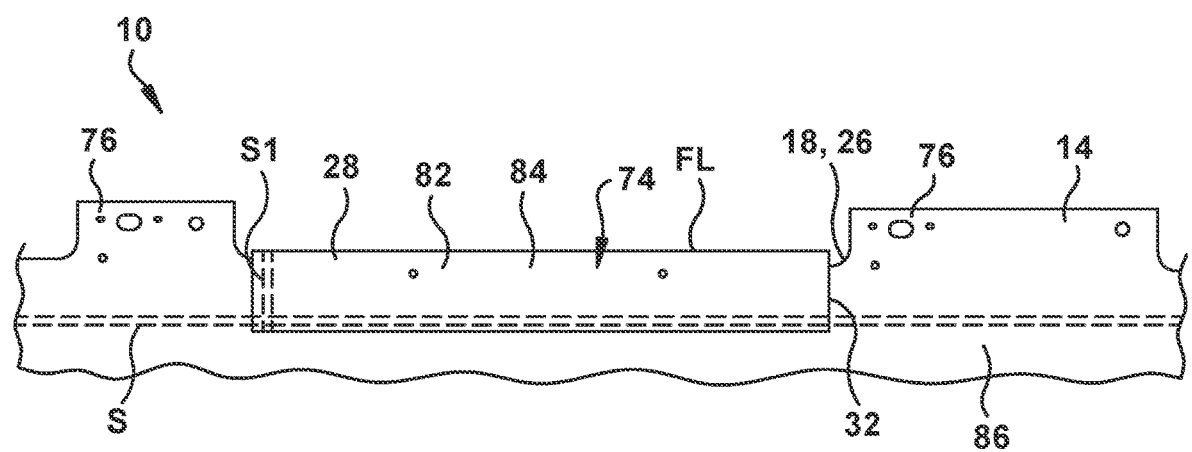

As shown in FIG. 37, an anti-twist sleeve 30 formed in the manner discussed above can be converted into an anti-twist pocket 28 by an additional line of stitching S1 that closes off one open end 32 of the anti-twist sleeve. The anti-twist structure 12 can be inserted into the cavity 74 through an open end 32 before or after an anti-twist sleeve 30 is converted into an anti-twist pocket 28.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
    a curtain airbag (CAB) having a packaged condition in which the CAB is rolled and/or folded to be installed along a roof rail in a vehicle, the CAB being configured to be inflated and deployed along a side structure of the vehicle structure;
    an elongated anti-twist structure for being positioned within the rolls and/or folds to inhibit relative twisting of the packaged CAB within the rolls and/or folds; and
    a CAB mount for extending about and supporting the packaged CAB in the vehicle, the CAB mount being separate from the anti-twist structure and being configured to receive a longitudinal section of the anti-twist structure, the CAB mount cooperating with the anti-twist structure to fix the position and orientation of the anti-twist structure, and thus the packaged CAB, relative to the vehicle, wherein the anti-twist structure is positioned between a rolled/folded portion of the CAB and pleats of a +1 fold portion of the CAB, the CAB mount extending about the CAB and the anti-twist structure.

2. An apparatus for helping to protect an occupant of a vehicle, comprising:
a curtain airbag (CAB) having a packaged condition in which the CAB is rolled and/or folded to be installed along a roof rail in a vehicle, the CAB being configured to be inflated and deployed along a side structure of the vehicle structure;
an anti-twist structure for being positioned within the rolls and/or folds to inhibit relative twisting of the packaged CAB within the rolls and/or folds; and
a CAB mount for extending about and supporting the packaged CAB in the vehicle, the CAB mount cooperating with the anti-twist structure to fix the position and orientation of the anti-twist structure, and thus the packaged CAB, relative to the vehicle, wherein the CAB mount comprises a fin and a detent between which the anti-twist structure, positioned within the CAB, is received.

3. The apparatus recited in claim 2, wherein the CAB mount grasps the anti-twist structure between the fin and the detent and fixes the relative position and orientation of the anti-twist structure relative to the vehicle.

4. The apparatus recited in claim 2, wherein the anti-twist structure is positioned adjacent a pleat along an upper edge of the CAB, and wherein the CAB mount fixes the position and orientation of the pleat relative to the vehicle.

5. The apparatus recited in claim 4, wherein the fin and the detent are positioned on opposing sides of the pleat and grasp the pleat to fix the position and orientation of the pleat relative to the vehicle.

6. The apparatus recited in claim 1, wherein the CAB mount includes overlying plate portions configured to receive a connector for connecting the packaged CAB to the vehicle.

7. The apparatus recited in claim 6, wherein a first overlying plate portion has a first support arm extending therefrom and a second overlying plate portion has a second support arm extending therefrom, the second support arm together with the second overlying plate portion defining a recess for receiving the packaged CAB, the first support arm extending over the packaged CAB received in the recess to hold the packaged CAB in the recess.

8. The apparatus recited in claim 1, wherein the CAB mount includes a plate portion configured to receive a connector for connecting the packaged CAB to the vehicle, the plate portion being connected to the CAB and the anti-twist structure positioned within the CAB to fix the position and orientation of the anti-twist structure, and thus the packaged CAB, relative to the vehicle.

9. The apparatus recited in claim 8, wherein the CAB mount further includes a support arm extending from the plate portion, the support arm extending around a portion of the packaged CAB and the anti-twist structure positioned within the CAB to fix the position and orientation of the anti-twist structure, and thus the packaged CAB, relative to the vehicle.

10. The apparatus recited in claim 8, wherein at least one airbag fastener extends about the CAB mount and the packaged CAB to secure the packaged CAB to the CAB mount, the at least one airbag fastener cooperating with the CAB mount to fix the position and orientation of the anti-twist structure, and thus the packaged CAB, relative to the vehicle.

11. The apparatus recited in claim 1, wherein the pleats of the +1 fold portion is positioned between a portion of the CAB mount and the anti-twist structure so that the pleats of the +1 fold portion are grasped between the CAB mount and the anti-twist structure, grasping the pleats of the +1 fold portion between the CAB mount and the anti-twist structure fixes the position and orientation of the pleats of the +1 fold portion relative to the vehicle, and wherein the rolled/folded portion of the CAB is positioned between a portion of the CAB mount and the anti-twist structure so that the rolled/folded portion of the CAB is grasped between the CAB mount and the anti-twist structure, grasping the rolled/folded portion of the CAB between the CAB mount and the anti-twist structure fixes the position and orientation of the rolled/folded portion relative to the vehicle.

12. The apparatus recited in claim 1, wherein the CAB mount comprises a fabric mounting wrap that extends around the packaged CAB and the anti-twist structure positioned within the CAB to fix the position and orientation of the anti-twist structure, and thus the packaged CAB, relative to the vehicle, the fabric mounting wrap being formed integrally with the CAB or formed separately from the CAB and stitched or otherwise connected to the CAB.

13. The apparatus recited in claim 1, further comprising a CAB mount at each end of the anti-twist structure.

14. The apparatus recited in claim 1, wherein the CAB further comprises an anti-twist pocket or sleeve for receiving the anti-twist structure.

15. The apparatus recited in claim 1, wherein the anti-twist structure has a rigidity or stiffness greater than that of the CAB fabric.

16. The apparatus recited in claim 1, wherein the anti-twist structure has a configuration that follows the architecture of the portion of the vehicle in which it is installed.

17. The apparatus recited in claim 1, wherein the anti-twist structure comprises a bar having a generally rectangular cross-section.

18. The apparatus recited in claim 1, wherein the anti-twist structure is constructed of metal or plastic, and wherein the CAB mount is constructed of metal, plastic, or fabric.

19. The apparatus recited in claim 1, wherein the CAB is a one-piece woven CAB or a cut-and-sewn CAB.

* * * * *